(12) United States Patent
Mizoue et al.

(10) Patent No.: US 8,840,368 B2
(45) Date of Patent: Sep. 23, 2014

(54) ABNORMAL VIBRATION DETECTION UNIT FOR WIND TURBINE GENERATOR

(75) Inventors: Taketo Mizoue, Tokyo (JP); Mitsuya Baba, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 910 days.

(21) Appl. No.: 12/962,842

(22) Filed: Dec. 8, 2010

(65) Prior Publication Data

US 2012/0051888 A1    Mar. 1, 2012

(30) Foreign Application Priority Data

Aug. 31, 2010    (JP) .................................. 2010-194468

(51) Int. Cl.
F03D 7/04    (2006.01)
F03D 11/00    (2006.01)

(52) U.S. Cl.
CPC ........... F03D 11/0091 (2013.01); *Y02E 10/722* (2013.01); *Y02E 10/723* (2013.01); *F05B 2270/807* (2013.01)
USPC .............................................. 416/35; 416/61

(58) Field of Classification Search
USPC .................. 415/18, 119; 416/35, 61
See application file for complete search history.

(56) References Cited

U.S. PATENT DOCUMENTS

| | | | | |
|---|---|---|---|---|
| 4,080,559 | A * | 3/1978 | Wright et al. .................... | 322/58 |
| 6,876,099 | B2 * | 4/2005 | Wobben .......................... | 290/44 |
| 7,860,663 | B2 * | 12/2010 | Miyasaka et al. ............... | 702/35 |
| 8,154,417 | B2 * | 4/2012 | Hauenstein et al. .......... | 340/683 |
| 8,240,991 | B2 * | 8/2012 | Boerlage et al. ................ | 416/1 |
| 2013/0025346 | A1 * | 1/2013 | Senkoji et al. ................. | 73/1.38 |

FOREIGN PATENT DOCUMENTS

| | | | |
|---|---|---|---|
| JP | 6317461 | A | 11/1994 |
| JP | 200065634 | A | 3/2000 |
| JP | 2000-321121 | A | 11/2000 |
| JP | 2004-530825 | A | 10/2004 |
| JP | 2008144682 | A | 6/2008 |
| JP | 2008190430 | A | 8/2008 |
| WO | 02/075153 | A1 | 9/2002 |

OTHER PUBLICATIONS

Office Action mailed May 7, 2014, corresponds to Japanese patent application No. 2010-194468.

* cited by examiner

*Primary Examiner* — Ned Landrum
*Assistant Examiner* — Ryan Ellis
(74) *Attorney, Agent, or Firm* — Benjamin J. Hauptman; Manabu Kanesaka

(57) ABSTRACT

An abnormal vibration detection unit which is capable of stopping a wind turbine generator when excessive vibration is detected. The vibration detection unit has first and second acceleration detectors, a calculation device, a filtering relay, and a safety system which performs an emergency stop of the wind turbine generator in accordance with an output terminal of the filtering relay. The filtering relay has a filter circuit to extract a frequency component from the second analog output signal. The calculation device generates a predicted value of the output signal of the filter circuit part, and detects a failure of the first and second acceleration detectors or the filter circuit part by comparing the predicted value of the output signal of the filter circuit part with a measured value of the output signal of the filter circuit part received from the filtering relay.

5 Claims, 3 Drawing Sheets

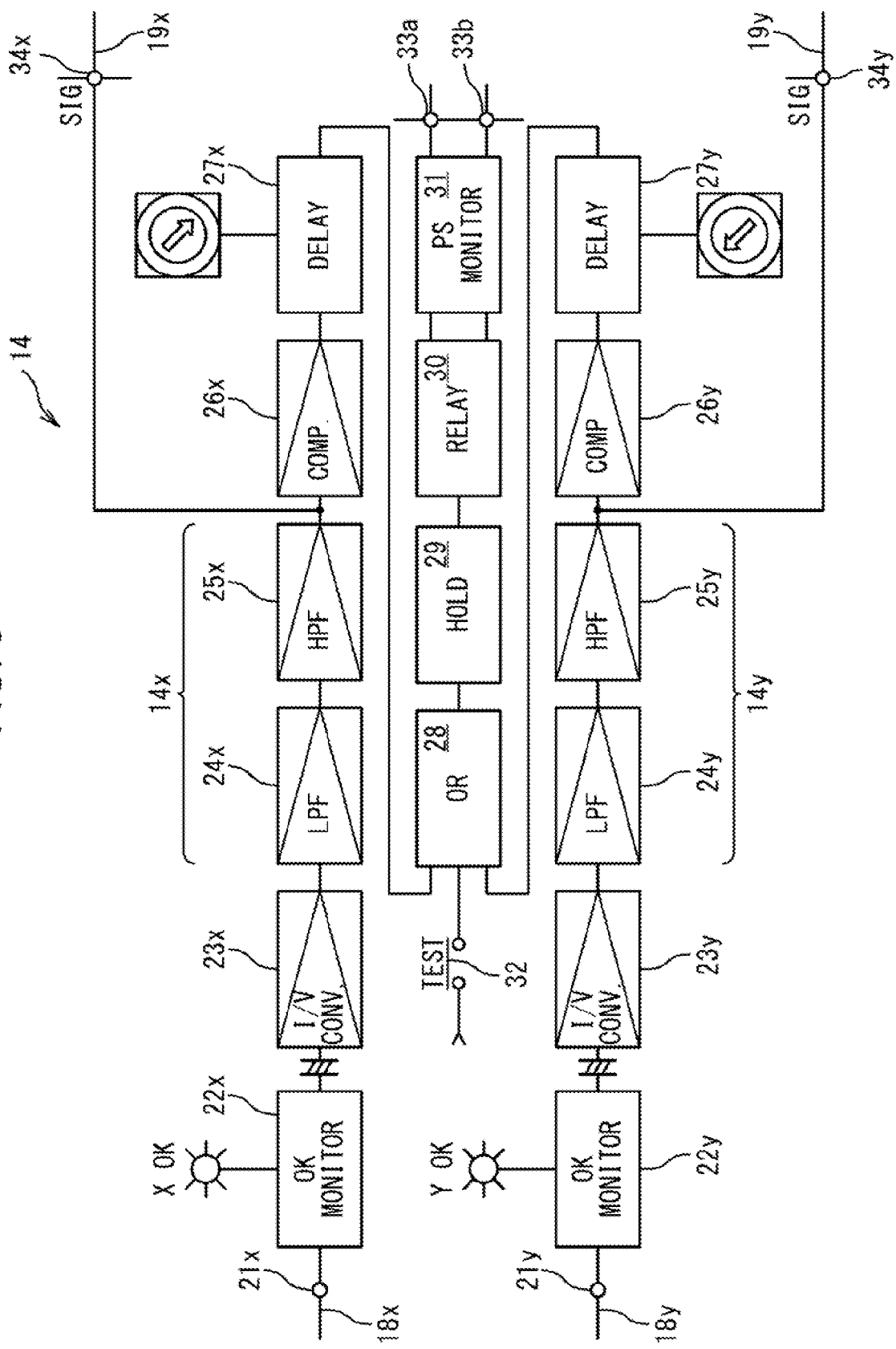

ABNORMAL VIBRATION DETECTION UNIT FOR WIND TURBINE GENERATOR

RELATED APPLICATIONS

The present application is based on, and claims priority from, Japanese Application Number 2010-194468, filed Aug. 31, 2010, the disclosure of which is hereby incorporated by reference herein in its entirety.

BACKGROUND OF THE INVENTION

1. Field of the Invention

The present invention relates to an abnormal vibration detection unit for a wind turbine generator, in particular to an abnormal vibration detection unit for detecting an occurrence of vibration excessive enough that the wind turbine generator needs to be stopped.

2. Description of the Related Art

The wind turbine generator is generally equipped with a safety system besides a control system for controlling a variety of devices of the wind turbine generator. The safety system performs an emergency stop of the wind turbine generator in a case where there occurs abnormality in which the wind turbine generator should be stopped. Herein, the safety system is provided separately from the control system so as to perform the emergency stop of the wind turbine generator even when the control system fails in such a case that a significant abnormality occurs.

Excessive vibration of a tower or a nacelle counts as a significant abnormality in which the operation of the wind turbine generator should be stopped. Depending on a level of vibration, the excessive vibration of the tower or the nacelle may cause the tower to collapse. Upon detecting the excessive vibration that can cause the tower to collapse, the safe system must stop the wind turbine generator.

One of the characteristics required for the safety system is to continue the operation of the wind turbine generator in the case of detecting vibration that poses no danger while stopping the wind turbine generator reliably in the case of detecting the excessive vibration that poses a danger. The vibration having a frequency near a natural frequency of the tower is particularly dangerous. The vibration of the frequency near the natural frequency of the tower needs to be monitored closely. Meanwhile, it is required to continue the operation of the wind turbine generator in the case where there occurs vibration that poses no danger in order to improve an operation rate of the wind turbine generator. For instance, WO2002/075153 (JP 2004-530825T) discloses a method of monitoring a tower oscillation of the frequency near a natural frequency of the tower in a wind turbine generator. Further, JP2000-321121A proposes an oscillation detection device for monitoring only an oscillation value of a device that is monitored near a natural frequency.

Another characteristic of the safety system is a failure detection of the safety system itself. The safety system should not continue the operation thereof for safety in such a case that the safety system fails. Therefore, the safety system is preferably designed so that the failure of the system can be detected. However, none of the related art described above considers an easy detection of the safety system.

[PATENT DOCUMENT 1] JP2004-530825T
[PATENT DOCUMENT 2] WO2002/075153
[PATENT DOCUMENT 3] JP2000-321121A

SUMMARY OF THE INVENTION

An object of the present invention is to provide an abnormal vibration detection unit that is capable of continuing an operation of a wind turbine generator when detecting vibration that poses no danger while reliably stopping the operation when detecting excessive vibration that poses danger and secondarily to provide a design of a safety system suitable for the failure detection which stops the wind turbine generator in such a case that an occurrence of the excessive vibration is detected.

The present invention proposes an abnormal vibration detection unit for detecting an abnormal vibration of a wind turbine generator, comprises: first and second acceleration detectors each of which detects an acceleration of the wind turbine generator at a specified position of the wind turbine generator; a calculation device which receives a first analog output signal that is outputted from the first acceleration detector a filtering relay which receives a second analog output signal that is outputted from the second acceleration detector; and a safety system which performs an emergency stop of the wind turbine generator in accordance with a state of an output terminal of the filtering relay.

The filtering relay of the abnormal vibration detection unit comprises: a filter circuit part equipped with an analog circuit that performs filtering process to extract a predetermined frequency component from the second analog output signal; an output circuit part switching a transition of a state of the output terminal of the filtering relay in response to an output signal of the filter circuit part; and a monitor output terminal extracting the output signal of the filter circuit part to outside of the filtering relay.

The calculation device of the abnormal vibration detection unit receives the output signal of the filter circuit part from the monitor output terminal, generates a predicted value of the output signal of the filter circuit part by performing digital calculation in which an operation of the filter circuit part is simulated for a value obtained from analog-digital conversion of the first analog output signal, and detects a failure of the first acceleration detector, the second acceleration detector or the filter circuit part by comparing the predicted value of the output signal of the filter circuit part with a measured value of the output signal of the filter circuit part received from the monitor output terminal.

The above filtering relay may further comprise a test switch, and the output circuit may comprise an OR circuit having an input connected to an output of the filter circuit part and the test switch, and is constituted like switching the state of the output terminal in response to an output signal of the OR circuit.

In one preferred embodiment, the calculation device monitors an input level of the first analog output signal, and the filtering relay further comprises an input monitor for monitoring an input level of the second analog output signal. In this case, the calculation device can determine an occurrence of a failure in the filter circuit part based on the input levels of the first and second analog output signals.

According to the present invention, a design suitable for the failure detection can be provided for an abnormal vibration detection unit configured such as to continue the operation of the wind turbine generator in the case of detecting vibration that poses no danger while stopping the wind turbine generator reliably in the case of detecting the excessive vibration that poses a danger occurs.

BRIEF DESCRIPTION OF THE DRAWINGS

[FIG. 3] A block diagram showing a structure of a filtering relay of the preferred embodiment of the present invention.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

Figure 1:
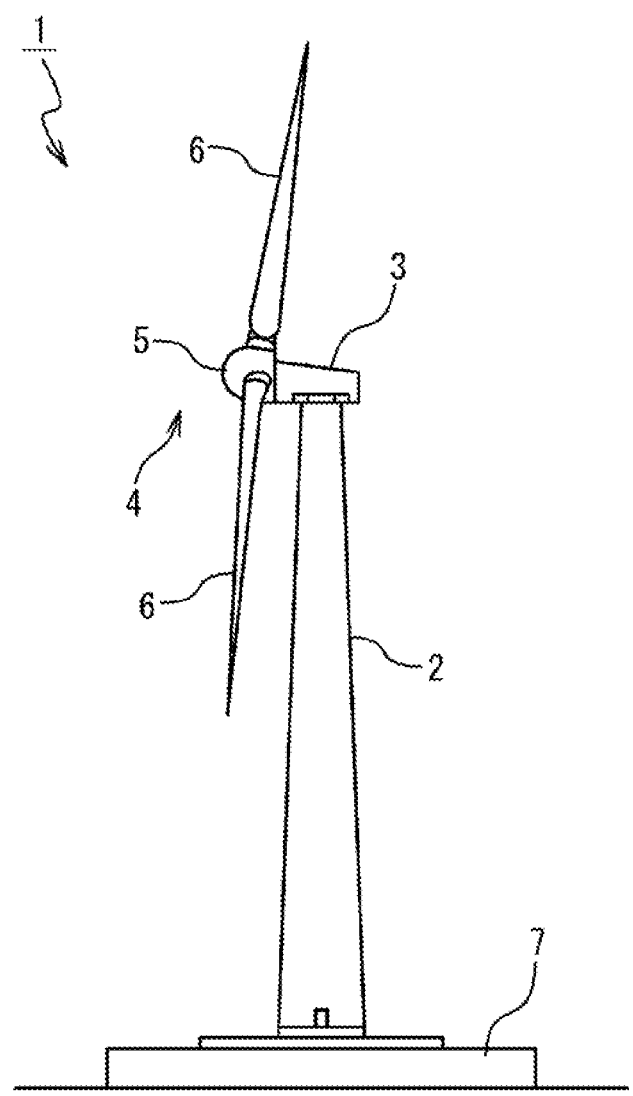
[FIG. 1] A side view showing a structure of a wind turbine generator of one preferred embodiment of the present invention.

FIG. 1 is a side view showing a structure of a wind turbine generator of one preferred embodiment of the present invention. The wind turbine generator 1 comprises a tower 2 installed upright from a base 7, a nacelle 3 installed on top of the tower 2 and a wind turbine rotor 4. The wind turbine rotor 4 comprises a rotor head 5 supported rotatably on the nacelle 3 and a blade 6 mounted on the rotor head 5. The wind turbine rotor 4 is rotated by the wind and then the wind turbine generator 1 generates electric power. The electric power is supplied to a grid connected to the wind turbine generator 1.

Figure 2:
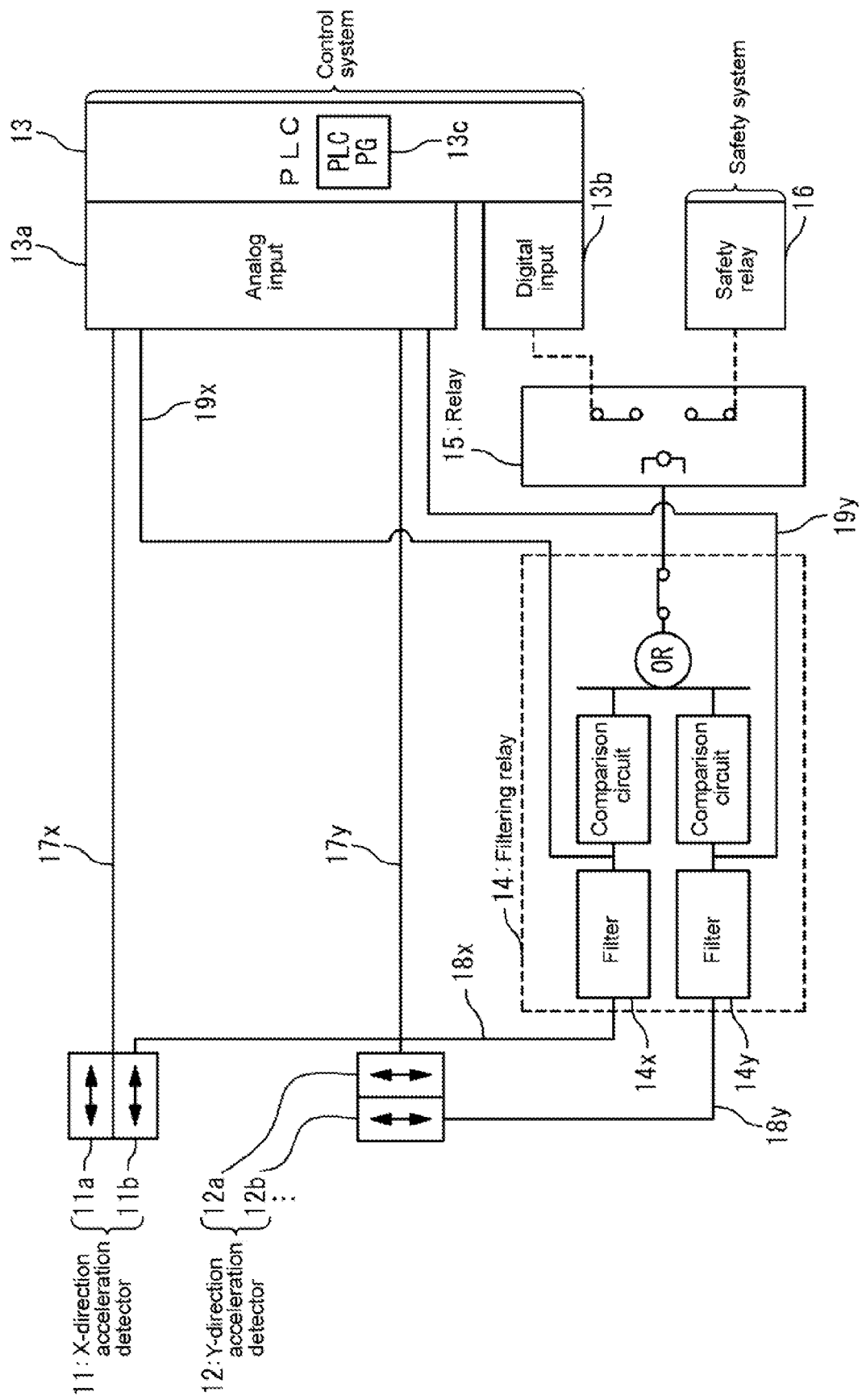
[FIG. 2] A block diagram showing a part of the control system and the safety system of one preferred embodiment of the present invention.

The wind turbine generator 1 also comprises a control system which controls each device provided in the wind turbine generator 1 and a safety system which performs an emergency stop of the wind turbine generator when there arises an abnormality. In the preferred embodiment, when detecting an occurrence of vibration excessive enough to break the tower 2, an emergency stop of the wind turbine generator 1 is performed. FIG. 2 is a block diagram showing a part of the control system and the safety system that constitute the abnormal vibration detection unit which detects excessive vibration.

In the preferred embodiment, the abnormal vibration detection unit comprises a x-direction acceleration detector 11, a y-direction acceleration detector 12, a PLC (Programmable Logic Controller) 13, a filtering relay 14, a relay 15 and a safety relay 16. The PLC 13 belongs to the control system and controls each device provided in the wind turbine generator 1. In contrast, the filtering relay 14, the relay 15 and the safety relay 16 belong to the safety system and perform an emergency stop of the wind turbine generator 1 when detecting excessive vibration. The x-direction acceleration detector 11 and the y-direction acceleration detector 12 are used in the control system and the safety system.

Both the x-direction acceleration detector 11 and the y-direction acceleration detector 12 are provided in the nacelle 3 and respectively detect acceleration at the installation positions where the sensors 11 and 12 are installed. The x-direction acceleration detector 11 and the y-direction acceleration detector 12 measure acceleration speeds of two directions that are perpendicular to each other and parallel to a horizontal direction. Herein, the direction whose speed is measured by the x-direction acceleration detector 11 is referred to as x-direction and the direction whose speed is measured by the y-direction acceleration detector 12 is referred to as y-direction. For instance, the x-direction is a direction of a straight line at which a vertical plane including the axis of the rotation center of the wind turbine rotor 4 intersects with a specified horizontal plane and the y-direction is a direction that is within the horizontal plane and perpendicular to the x-direction.

The x-direction acceleration detector 11 has two channels. A first channel 11a of the x-direction acceleration detector 11 is connected to an analog input 13a of the control system 13 via a signal line 17x to send the PLC 13 an analog output signal corresponding to the acceleration speed of the x-direction at the installation position of the x-direction acceleration detector. Meanwhile, a second channel 11b of the x-direction acceleration detector 11 is connected to the filtering relay 14 via a signal line 18x to send the filtering relay 14 an analog output signal corresponding to the acceleration speed at the installation position of the x-direction acceleration detector 11. The first channel 11a and the second channel 11b of the x-direction acceleration detector 11 respectively function as an independent acceleration detector.

In the manner similar to the x-direction acceleration detector 11, the y-direction acceleration detector 12 has two channels. A first channel 12a of the y-direction acceleration detector 12 is connected to the analog input 13a of the control system 13 via a signal line 17y to send the PLC 13 an analog output signal corresponding to the acceleration speed of the y-direction at the installation position of the y-direction acceleration detector 12. Meanwhile, a second channel 12b of the y-direction acceleration detector 12 is connected to the filtering relay 14 via a signal line 18y to send the filtering relay 14 an analog output signal corresponding to the acceleration speed at the installation position of the y-direction acceleration detector 12. The first channel 12a and the second channel 12b of the y-direction acceleration detector 12 respectively function as an independent acceleration detector.

Further, the x-direction acceleration detector 11 and the y-direction acceleration detector 12 may be installed in the tower 2 (particularly, near the top of the tower 2) instead of in the nacelle 3.

The PLC 13 controls each device provided in the wind turbine generator 1. The PLC 13 comprises the analog input 13a receiving a variety of analog signals and an digital input 13b receiving a variety of digital signals, and performs a variety of controls in response to the received variety of signals. During the process, the analog input 13a performs analog-digital conversion of the received analog signals. The analog input 13a performs analog-digital conversion of analog output signals received by the PLC 13 from the first channel 11a of the x-direction acceleration detector 11 and from the first channel 12a of the y-direction acceleration detector 12. A desired process is performed on the digital value obtained from the analog-digital conversion.

The filtering relay 14 performs a filtering process to extract a frequency component of a frequency domain near a natural frequency of the tower 2 from the analog output signal outputted from the x-direction acceleration detector 11 and the y-direction acceleration detector 12 and outputs a signal to perform an emergency stop of the wind turbine generator 1 in response to the extracted frequency component. The frequency component of the frequency domain near the natural frequency of the tower 2 is selectively extracted and the emergency stop of the wind turbine generator 1 is performed in response to the extracted frequency component so that the emergency stop of the wind turbine generator 1 is performed when detecting an occurrence of vibration excessive enough to break the tower 2 while the operation of the wind turbine generator can be continued when detecting the vibration that poses no danger.

Basically, the filtering relay 14 comprises filters 14x and 14y. The filter 14x extracts a frequency component of a frequency domain near the natural frequency of the tower 2 from the analog output signal received from the second channel 11b of the x-direction acceleration detector 11. Meanwhile, the filter 14y extracts a frequency component of a frequency domain near a natural frequency of the tower 2 from the analog output signal received from the second channel 12b of the y-direction acceleration detector 12. In such a case that one of the frequency components extracted by the filters 14x and 14y exceeds a prescribed threshold, the filtering relay 14 opens an output terminal of the filtering relay 14. Specifically, the state that the output terminal of the filtering relay 14 is opened means that there is excessive vibration. As described later, the filtering relay 14 is configured such that the output signals of the filters 14x and 14y can be extracted externally.

The relay 15 generates an emergency stop signal in response to the output of the filtering relay 14. The generated emergency stop signal is supplied to the digital input 13b of the PLC 13 and the safety relay 16. Basically, when the output terminal of the filtering relay 14 becomes open, the emergency stop signal is asserted (the signal becomes effective). The safety relay 16 performs emergency stop of the wind turbine generator 1 in such a case that the emergency stop signal supplied from the relay 15 is asserted. Meanwhile, the PLC 13 recognizes the occurrence of vibration excessive enough that the emergency stop of the wind turbine generator 1 needs to be performed in such a case that the PLC 13 recognizes the emergency signal from the relay 15 is asserted.

FIG. 3 is a block diagram showing a structure of the filtering relay 14 of a preferred embodiment of the present invention. The filtering relay 14 of the preferred embodiment comprises input terminals 21x and 21y, input monitors 22x and 22y, current-voltage conversion circuits 23x and 23y, LPFs (low pass filter) 24x and 24y, HPFs (high pass filter) 25x and 25y, comparison circuits 26x and 26y, delay circuits 27x and 27y, an OR circuit 28, a hold circuit 29, a relay 30, a power monitor 31, a test switch 32, output terminals 33a and 33b and monitor output terminals 34x and 34y.

The input terminal 21x receives an analog output signal from the second channel 11b of the x-direction acceleration detector 11 via the signal line 18x. The input terminal 21y receives an analog output signal from the second channel 12b of the y-direction acceleration detector 12 via the signal line 18y. In the preferred embodiment, the analog output signals received from the sensors 11 and 12 are current signals, i.e. signals whose current levels correspond to accelerations in x-direction and y-direction.

The input monitor 22x, the current-voltage conversion circuit 23x, the LPF 24x, the HPF 25x, the comparison circuit 26x and the delay circuit 27x constitute a circuit part for detecting excessive vibration in the x-direction based on the analog output signal received from the second channel 11b of the x-direction acceleration detector 11. All of these circuits are configured as analog circuits.

Specifically, the input monitor 22x monitors an input level of the analog output signal received from the second channel 11b of the x-direction acceleration detector 11. The input monitor 22x issues an alarm in such a case that the input level of the analog output signal is abnormal, e.g. the input level is below a prescribed threshold. By this, the failure of the x-direction acceleration detector 11 can be detected. The failure of the x-direction acceleration detector herein includes disconnection of the signal line 18x between the second channel 11b of the x-direction acceleration detector 11 and the input terminal 21x. The current-voltage conversion circuit 23x coverts the analog output signal which is a current signal into a voltage signal, i.e. the voltage signal whose voltage level corresponds to acceleration in x-direction).

The LPF 24x and the HPF 25x constitute the filter 14x that extracts a frequency component of a frequency domain near the natural frequency $f_0$ of the tower 2 from the analog output signal. The LPF 24x passes a frequency component that is lower than a prescribed frequency component $f_1$ and the LPF 25x passes a frequency component that is higher than a prescribed component $f_2$. The LPF 24x and the HPF 25x are configured such that $f_0$ is the natural frequency of the tower 2 and the inequality of $f_2 < f_0 < f_1$ is satisfied. By this, the frequency component of the frequency domain near the natural frequency $f_0$ of the tower 2 is outputted from the HPF 25x. The comparison circuit 26x monitors a signal level of the output signal of the HPF 25x. The comparison circuit 26x asserts the output signal in such a case that an absolute value of the signal level is greater than the prescribed value. The delay circuit 27x delays the output signal of the comparison circuit 26x for a prescribed period of time. The output signal of the delay circuit 27x is a signal that indicates presence or absence of excessive vibration in the x-direction. That is, when there is excessive vibration in the x-direction, the output of the delay circuit 27x is asserted.

In the similar manner, the input monitor 22y, the current-voltage conversion circuit 23y, the LPF 24y, the HPF 25y, the comparison circuit 26y and the delay circuit 27y constitute a circuit part for detecting excessive vibration in the y-direction based on the analog output signal received from the second channel 12b of the y-direction acceleration detector 12. The operation of the y-direction circuit part is the same as that of the x-direction circuit part for detecting excessive vibration. The output of the delay circuit 27 is the signal that indicates presence or absence of the excessive vibration in the y-direction. That is, when there is excessive vibration in the y-direction, the output of the delay circuit 27y is asserted.

The OR circuit 28, the hold circuit 29, the relay 30 and the power monitor 31 constitutes a circuit part for generating an output of the filtering relay. When excessive vibration in at least one of the x-direction and y-direction is detected, the output terminal 33a and the output terminal 33b of the filtering relay 14 are opened. Specifically, the OR circuit 28 outputs an output signal, which corresponds to logic add of the output signals of the delay circuits 27x and 27y. When the output signal of the OR circuit 28 is asserted, the hold circuit 29 asserts the output signal for a prescribed period of time. When the output of the hold circuit 29 is asserted, the pair of output terminals is opened. The power monitor 31 monitors an output terminal of the relay 30. The power monitor 31 opens the output terminals 33a and 33b of the filtering relay 14 in such a case that the output terminals of the relay 30 are opened. Further, the power monitor 31 opens the output terminals 33a and 33b when the power supply to the filtering relay 14 is shut off.

The circuit part of the filtering relay 14 for detecting excessive vibration, i.e. the input monitors 22x and 22y, the current-voltage conversion circuit 23x and 23y, the LPFs 24x and 24y, the HPFs 25x and 25y, the comparison circuits 26x and 26y and the delay circuits 27x and 27y, is all configured as an analog circuit. This is to improve reliability of the filtering relay 14. The analog circuit with a simple structure can reduce the failure thereof. This characteristic is very suitable for use in the safety system.

Moreover, the filtering relay 14 has a structure capable of simplifying a failure detection of circuits in the x-direction acceleration detector 11, the y-direction acceleration detector 12 and the filtering relay 14. The filtering relay 14 comprises monitor output terminals 34x and 34y. The monitor output terminal 34x is connected to an output terminal of the HPF 25x to output an output signal of the HPF 25x to outside. By monitoring the output signal outputted from the monitor output terminal 34x, it is possible to detect the failure occurrence in any of the circuit parts arranged between the x-direction acceleration detector 11 or the input terminal 21x and the monitor output terminal 34x. In the similar manner, the monitor output terminal 34y is connected to an output terminal of the HPF 25y to output an output signal of the HPF 25y to outside. By monitoring the output signal outputted from the monitor output terminal 34y, it is possible to detect the failure occurrence in any of the circuit parts arranged between the y-direction acceleration detector 12 and the monitor output terminal 34y, or between the input terminal 21y and the monitor output terminal 34y.

In the preferred embodiment, the PLC 13 performs the failure detection of the x-direction acceleration detector 11, the y-direction acceleration detector 12 and the filtering relay 14. An exemplary case of PLC 13 performing the failure detection is explained below.

The monitor output terminals 34x and 34y are connected to the analog input 13a of the PLC 13 via the signal lines 19x and 19y. The output signals of the monitor output terminals 34x and 34y are supplied to the PLC 13. Meanwhile, the PLC 13 has a software program 13c integrated therein for simulating an operation of the current-voltage conversion circuits 23x and 23y and the filters 14x and 14y. Specifically, the software program 13c generates a predicted value of the output signal of the filter 14x by performing digital calculation of a value obtained from analog-digital conversion of the analog output signal of the first channel 11a of the x-direction acceleration detector 11. Further, the software program 13c detects a failure in any circuit part between the x-direction acceleration detector 11 or the input terminal 21x and the monitor output terminal by comparing the predicted value of the output signal of the filter 14x with a measured value of the output signal of the filter 14x received from the monitor output terminal 34x. For instance, in such a case that a difference between the measured value of the output signal of the filter 14x and the predicted value of the output signal of the filter 14x is greater than a prescribed value for a preset period of time, the software program 13c determines that there is a failure in one of the circuit parts arranged between the x-direction acceleration detector 11 or the input terminal 21x and the monitor output terminal 34x.

In the similar manner, the software program 13c generates a predicted value of the output signal of the filter 14y by performing digital calculation of a value obtained from analog-digital conversion of the analog output signal of the first channel 12a of the y-direction acceleration detector 12. Further, the software program 13c detects a failure in any circuit part between the y-direction acceleration detector 12 or the input terminal 21y and the monitor output terminal 34y by comparing the predicted value of the output signal of the filter 14y with a measured value of the output signal of the filter 14y received from the monitor output terminal 34y. Based on the comparison results.

In the failure detection, it is possible to locate any point having a failure by referring to input levels of the analog output signals inputted to the PLC 13 and the filtering relay 14 from the x-direction acceleration detector 11 and the y-direction acceleration detector 12. For instance, in such a case that a difference between the measure value of the output signal of the filter 14x and the predicted value of the output signal of the filter 14x is great and the input level of the analog output signal of the first channel 11a of the x-direction acceleration detector 11 is extremely small (the value obtained from analog-digital conversion of the analog output signal), the PLC 13 determines that there is a failure in the first channel 11a of the x-direction acceleration detector 11. Further, in such a case that a difference between the measure value of the output signal of the filter 14x and the predicted value of the output signal of the filter 14x is great and the input level of the analog output signal supplied from the second channel 11b of the x-direction acceleration detector 11 to the input terminal 21x is extremely small, the PLC 13 determines that there is a failure in the second channel 11b of the x-direction acceleration detector 11. It is very important that the input monitor 22x monitor this. In such a case that a difference between the measure value of the output signal of the filter 14x and the predicted value of the output signal of the filter 14x is great and both of the input levels of the analog output signals supplied from the first channel 11a and the second channel 11b of the x-direction acceleration detector 11 are in a normal range, the PLC 13 determines that there is a failure in the circuit part between the input terminal 21x of the filtering relay 14 and the monitor output terminal 34x.

In the similar manner, it is possible to locate any point having a failure in such a case that a difference between the measure value of the output signal of the filter 14y and the predicted value of the output signal of the filter 14y is great.

As another structure to simplify the failure detection, there is the test switch 32 connected to an input of the OR circuit 28. In the preferred embodiment, the test switch 32 is connected to the input of the OR circuit 28 so as to detect a failure in the OR circuit 28, the hold circuit 29, the relay and the power monitor 31. Specifically, the OR circuit 28 has three inputs that are connected to the outputs of the delay circuits 27x and 27y and the test switch 32. Thus, when the test switch 32 is turned on, the output signal of the OR circuit and the output signal of the hold circuit 29 are asserted and the output terminals 33a and 33b of the filtering relay 14 are opened. If the output terminals 33a and 33b of the filtering relay 14 are not opened although the test switch 32 is turned on, it is determined that there is a failure in any one of the OR circuit 28, the hold circuit 29, the relay and the power monitor 31. That is, the failure detection of the OR circuit 28, the hold circuit 29, the relay and the power monitor 31 can be performed by turning on the switch 32.

As described above, the filtering relay 14 of the preferred embodiment is configured so as to be capable of detecting a failure in a major part thereof (the circuit parts except for the comparison circuits 26x and 26y and the delay circuits 27x and 27y). This is suitable for improving the reliability of the abnormal vibration detection unit.

As described above, in the abnormal vibration detection unit of the preferred embodiment, the filters 14x and 14y selectively extracts the frequency component of the frequency domain near the natural frequency of the tower 2 so as to perform an emergency stop of the wind turbine generator 1 in response to the obtained frequency component. By this, it is possible to continue the operation of the wind turbine generator in the case of detecting vibration that poses no danger while stopping the wind turbine generator 1 reliably in the case of detecting the excessive vibration that poses a danger occurs. Further, the abnormal vibration detection unit of the preferred embodiment is configured such as to simplify the failure detection of the x-direction acceleration detector 11 and the y-direction acceleration detector 12 for detecting the excessive vibration and the filtering relay 14, resulting in improving the reliability of the abnormal vibration detection unit.

The invention claimed is:

1. An abnormal vibration detection unit for detecting an abnormal vibration of a wind turbine generator, comprising:
   first and second acceleration detectors each of which detects an acceleration of the wind turbine generator at a specified position of the wind turbine generator;
   a calculation device which receives a first analog output signal that is outputted from the first acceleration detector;

a filtering relay which receives a second analog output signal that is outputted from the second acceleration detector; and a safety system which performs an emergency stop of the wind turbine generator depending on whether an output terminal of the filtering relay is open or closed, wherein the filtering relay comprises: a filter circuit part equipped with an analog circuit that performs a filtering process to extract a predetermined frequency component from the second analog output signal; an output circuit part for opening and closing the output terminal of the filtering relay in response to an output signal of the filter circuit part; and a monitor output terminal extracting the output signal of the filter circuit part to outside of the filtering relay, and wherein the calculation device receives the output signal of the filter circuit part from the monitor output terminal, generates a predicted value of the output signal of the filter circuit part by performing a digital calculation in which an operation of the filter circuit part is simulated for a value obtained from analog-digital conversion of the first analog output signal, and detects a failure of the first acceleration detector, the second acceleration detector or the filter circuit part by comparing the predicted value of the output signal of the filter circuit part with a measured value of the output signal of the filter circuit part received from the monitor output terminal.

2. The abnormal vibration detection unit according to claim 1, wherein the filtering relay further comprises a test switch, and wherein the output circuit comprises an OR circuit having an input connected to an output of the filter circuit part and the test switch, and is configured to control the output terminal to be opened or closed in response to an output signal of the OR circuit.

3. The abnormal vibration detection unit according to claim 1, wherein the calculation device monitors an input level of the first analog output signal, wherein the filtering relay further comprises an input monitor for monitoring an input level of the second analog output signal, and wherein the calculation device is configured such that when the failure of the first acceleration detector, the second acceleration detector or the filter circuit part is detected, identifies location of the failure based on the input levels of the first and second analog output signals.

4. A wind turbine generator, comprising:

first and second acceleration detectors each of which detects an acceleration of the wind turbine generator at a specified position of the wind turbine generator;

a calculation device which receives a first analog output signal that is outputted from the first acceleration detector;

a filtering relay which receives a second analog output signal that is outputted from the second acceleration detector; and a safety system which performs an emergency stop of the wind turbine generator depending on whether an output terminal of the filtering relay is open or closed, wherein the filtering relay comprises: a filter circuit part equipped with an analog circuit that performs a filtering process to extract a predetermined frequency component from the second analog output signal; an output circuit part for opening and closing the output terminal of the filtering relay in response to an output signal of the filter circuit part; and a monitor output terminal extracting the output signal of the filter circuit part to outside of the filtering relay, and wherein the calculation device receives the output signal of the filter circuit part from the monitor output terminal, generates a predicted value of the output signal of the filter circuit part by performing a digital calculation in which an operation of the filter circuit part is simulated for a value obtained from analog-digital conversion of the first analog output signal, and detects a failure of the first acceleration detector, the second acceleration detector or the filter circuit part by comparing the predicted value of the output signal of the filter circuit part with a measured value of the output signal of the filter circuit part received from the monitor output terminal.

5. The wind turbine generator according to claim 4, wherein the filtering relay further comprises a test switch, and wherein the output circuit comprises an OR circuit having an input connected to an output of the filter circuit part and the test switch, and is configured to control the output terminal to be opened or closed in response to an output signal of the OR circuit.

* * * * *